United States Patent [19]

Dennis

[11] 4,128,882
[45] Dec. 5, 1978

[54] PACKET MEMORY SYSTEM WITH HIERARCHICAL STRUCTURE

[75] Inventor: Jack B. Dennis, Belmont, Mass.

[73] Assignee: Massachusetts Institute of Technology, Cambridge, Mass.

[21] Appl. No.: 716,071

[22] Filed: Aug. 19, 1976

[51] Int. Cl.² .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,764,996 | 10/1973 | Ross | 364/200 |
| 3,806,888 | 4/1974 | Brickman et al. | 364/200 |
| 3,820,078 | 6/1974 | Curley et al. | 364/200 |
| 3,896,419 | 7/1975 | Lange et al. | 364/200 |
| 3,898,624 | 8/1975 | Tobias | 364/200 |
| 3,911,401 | 10/1975 | Lee | 364/200 |
| 3,938,097 | 2/1976 | Niguette | 364/200 |

*Primary Examiner*—Leo H. Boudreau
*Attorney, Agent, or Firm*—Arthur A. Smith, Jr.; Gerald Altman

[57] ABSTRACT

Packet communication is used in the architecture of a memory system having hierarchical structure. The behavior of this memory system is prescribed by a formal memory model appropriate to a computer system for data flow programs.

17 Claims, 12 Drawing Figures

Item Removal:

Reference Accounting:

PACKET MEMORY SYSTEM WITH HIERARCHICAL STRUCTURE

The Government has rights to this invention pursuant to Grant No. NSF-76-58-GI-34761 and Institutional Patent Agreement No. 0100 awarded by the National Science Foundation.

RELATION APPLICATIONS AND INFORMATION

The present application is related to application Ser. No. 605,932, filed Aug. 19, 1975 in the names of Jack B. Dennis and David P, Misunas for Data Processing Apparatus For Highly Parallel Execution Of Stored Programs, which is a continuation-in-part of application Ser. No. 456,488, filed Mar. 29, 1974, now U.S. Pat. No. 3,962,706, issued June 8, 1976, in the names of Jack B. Dennis and David P. Misunas for Data Processing Apparatus For Highly Parallel Execution Of Stored Programs. The present invention is also related to application Ser. No. 715,723, filed Aug. 19, 1977 in the name of the applicant herein for Packet Memory System For Processing Many Independent Memory Transactions Concurrently.

BACKGROUND OF THE INVENTION

1. Field of the Invention

Packet communication architecture is the structuring of data processing systems as collections of physical units that communicate only by sending information packets of fixed size, using an asynchronous protocol. Each unit is designed so it never has to wait for a response to a packet it has transmitted to another unit while other packets are waiting for its attention. Packets are routed between sections of a system by networks of units arranged to sort many packets concurrently according to their destination. In this way, it is possible to arrange that system units are heavily used provided concurrency in the task to be performed can be exploited. The packet communication principle is especially attractive for data flow processors since the execution of data flow programs readily separates into many independent computational events. The present invention relates to the use of packet communication in the architecture of memory systems having hierarchical structure. The behavior of these memory systems is prescribed by a formal memory model appropriate to a computer system for data flow programs.

2. The Prior Art

With the advent of large scale integration (LSI) technology, one of the main directions of further advance in the power of large computer systems is through exploitation of parallelism. Attempts to achieve parallelism in array processors, associative processors and vector or pipeline machines have succeeded only with the sacrifice of programmability. These large parallel machines all require that high levels of local parallelism be expressed in program formats that retain the notion of sequential control flow. Since most algorithms do not naturally exhibit local parallelism in the form expected by these machines, intricate data representations and convoluted algorithms must be designed if the potential of the machine is to be approached.

The alternative is to design machines that can exploit the global parallelism in programs, that is, to take advantage of opportunities to execute unrelated parts of a program concurrently. Conventional sequential machine languages are unsuited to this end because identification of concurrently executable program parts is a task of great difficulty. Data flow program representations are of more interest, for only essential sequencing relationships among computational events are indicated. An instruction in a data flow program is enabled for execution by the arrival of its operand values — there is no separate notion of control flow, and where there is no data dependence between program parts, the parts are implicitly available for parallel execution.

Several designs for data processing systems have been developed that can achieve highly parallel operation by exploiting the global concurrency of programs represented in data flow form [1-6]. Two of these designs [3, 6] are able to execute programs expressed in a conventional high-level language that exceeds Algol 60 in generality. These systems consist of units that operate independently and interact only by transmitting information packets over channels that connect pairs of units. The units themselves may have a similar structure that we call packet communication architecture.

Details of the above designated references are given below.

LIST OF REFERENCES

1. Dennis, J. B., and D. P. Misunas, "A computer architecture for highly parallel signal processing," *Proceedings of the ACM* 1974 *National Conference,* ACM, New York, (November, 1974), 402–409.
2. Dennis, J. B., and D. P. Misunas, "A preliminary architecture for a basic data-flow processor," *Proceedings of the Second Annual Symposium on Computer Architecture,* IEEE, New York (January 1975), 126–132.
3. Misunas, D. P. *A Computer Architecture for Data-Flow Computation.* SM Thesis, Department of Electrical Engineering and Computer Science, M.I.T., Cambridge, MA (June 1975).
4. Misunas, D. P., "Structure processing in a data-flow computer," *Proceedings of the* 1975 *Sagamore Computer Conference on Parallel Processing,* IEEE, New York (August 1975)
5. *Project MAC Progress Report XI,* Project MAC, M.I.T. (July 1973–1974), pp. 84–90.
6. Rumbaugh, J. E., *A Parallel Asynchronous Computer Architecture for Data Flow Programs,* Project MAC, M.I.T., Cambridge, MA, Report TR-150 (May 1975).

The disclosures of the foregoing references are incorporated into the present application by reference. The disclosures of aforementioned related U.S. Pat. No. 3,962,706, related application Ser. No. 605,932, are related application Ser. No. 715,723 are incorporated into the present application by reference.

SUMMARY

The primary object of the present invention is to provide a memory system for a digital data processor, which memory system is characterized by: at least a higher level sub-memory system containing records representing relatively active items of information; at least a lower level sub-memory system containing records representing relatively inactive items of information; a peripheral input network for peripheral command signals and peripheral store signals representing peripheral command packets and peripheral store packets, respectively, by which peripheral command signals are transmitted to the higher level memory and peripheral store signals are transmitted to the higher level memory and to the lower level memory; a peripheral output network for peripheral retrieval signals, peripheral command signals and peripheral unid (unique identifier) signals representing peripheral retrieval packets, peripheral command packets and peripheral unid packets, respectively, by which peripheral retrieval signals and peripheral command signals are transmitted from the lower level memory and to the upper level memory and peripheral unid signals are transmitted from the lower level memory: an internal output network for internal retrieval signals and internal command signals representing internal retrieval packets and internal command packets, by which the internal retrieval signals and the internal command signals are transmitted from the higher level memory; and an internal input network for internal command signals representing internal command packets by which the internal command signals are transmitted to the lower level memory. The arrangement is such as to permit a large memory system, in which only the most active information is held in relatively expensive fast access devices and less active information may be held in relatively inexpensive slow access devices.

Other objects of the present invention will in part be obvious and will in part appear hereinafter.

The invention accordingly comprises the system, its components and their interrelationships, of the present disclosure, the scope of which will be indicated in the appended claims.

BRIEF DESCRIPTION OF THE DRAWINGS

For a fuller understanding of the nature and objects of the present invention, reference is made to the following detailed description, which is to be taken in connection with the accompanying drawings, wherein.

DETAILED DESCRIPTION

Overview of the Preferred Embodiment

Figure 1:
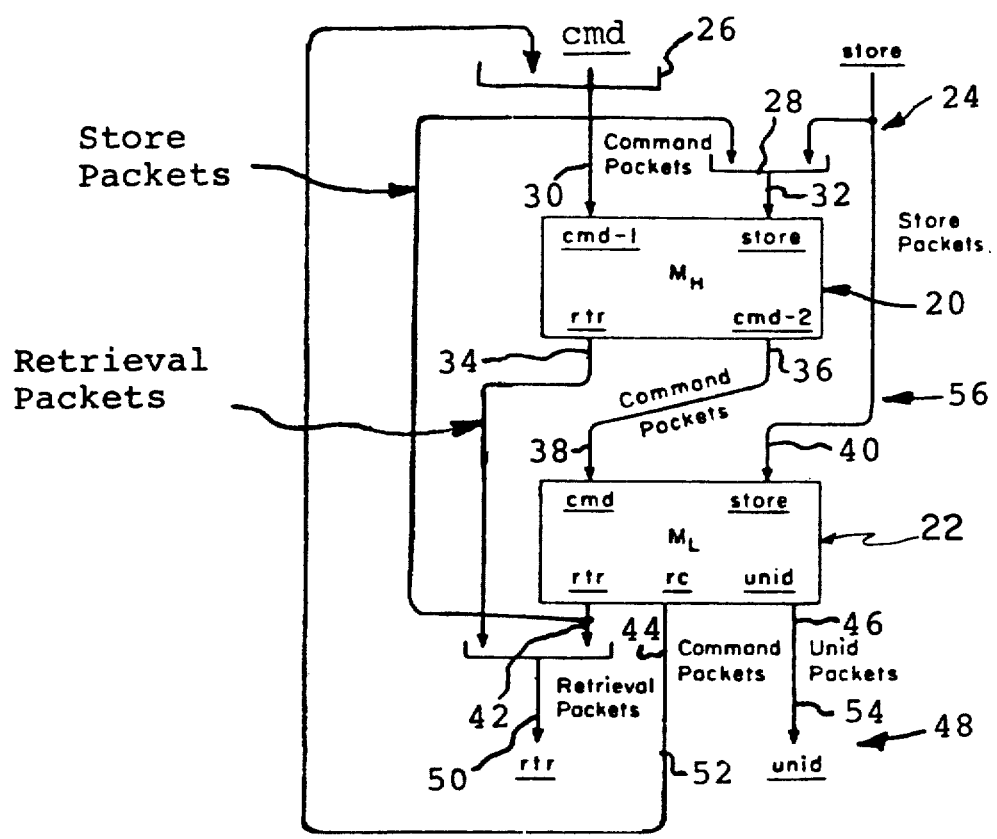
FIG. 1 is a general schematic of a system embodying the present invention.

Generally, the embodiment of FIG. 1 is a memory system having the following structure for incorporation into a digital data processor. A high level or active memory ($M_H$) 20 contains records representing active items of information. A low level or inactive memory ($M_L$) 22 contains records representing inactive items of information. High level memory 20 includes an input command (cmd-1) port 30, a store port 32, a retrieval (rtr) port 34 and an output command (cmd-2) port 36. Low level memory 22 includes a command (cmd) port 38, a store port 40, a retrieval (rtr) port 42, a retrieval command (rc) port 44 and a unique identifier (unid) port 46. A peripheral input network 24 includes a command (cmd) port 26 and a store port 28. A peripheral output network 48 includes a retrieval (rtr) port 50, a retrieval command port (rc) 52 and a unique identifier (unid) port 54. An internal output-input network 56 completes the interconnections.

The interrelationships among the foregoing elements are as follows. Peripheral command signals representing peripheral command packets entering the memory system are transmitted from command port 26 of peripheral input network 24 to input command port 30 of high level memory 20. Peripheral store signals representing peripheral store packets entering the memory system are transmitted from store port 28 of input network 24 to store port 32 of high level memory 20 and to store port 40 of low level memory 22. Retrieval signals representing retrieval packets are transmitted from retrieval port 34 of high level memory 20 and from retrieval port 42 of low level memory 22 and are merged at retrieval port 50 of peripheral output network 48 where they leave the memory system. Also retrieval signals representing retrieval packets are transmitted from retrieval port 42 of low level memory 22 and are merged with peripheral store signals at store port 28 of input network 24. Output command signals representing output command packets are transmitted from output command port 36 of high level memory 20 through internal input-output network 56 to command port 38 of low level memory 22. Retrieval command signals representing retrieval command packets are transmitted from retrieval command port 44 of low level memory 22 through retrieval command port 52 of peripheral output network 48 to command port 26 of peripheral input network 24. Unid signals representing unid packets are transmitted from unit port 46 of low level memory 22 through unit port 54 of peripheral output network 48 where they leave the memory system.

Structural details of high level memory 20 and low level memory 22 are shown in the accompanying drawings and are described below and further structural details thereof are described in related U.S. Pat. No. 3,962,706 and in related application Ser. No. 715,723. Structural details of the memory systems presented in related application Ser. No. 715,723 include structure of each memory system as a plurality of sub-memory systems, among which data items stored in the memory transactions concurrently distributed among the plurality of sub-memory systems by distribution networks and results of memory transactions concurrently collected and formed into streams of results to be presented at the outputs of the memory system by arbitration networks. Structural details of distribution networks for the concurrent transferral of memory requests to the sub-memory systems are described in related application Ser. No. 715,723 and further details are described in related U.S. Pat. No. 3,962,706, in FIGS. 39, 40, 41, and 42 and at column 16, line 13 to column 17, line 17. Structural details of arbitration networks for the concurrent transferral of memory results from the sub-memory systems are described in related application Ser. No. 715,723 and further details are described in related U.S. Pat. No. 3,962,706, in FIGS. 35, 36, 37, and 38, and at column 14, line 46 to column 16, line 12.

Details of the components of the foregoing memory system are described below following a discussion of background considerations to facilitate understanding. In the following discussion, for convenience, information packets are said to be transmitted and stored although it is to be understood that, in reality, signals and records representing such packets really are being described.

THE PACKET COMMUNICATION PRINCIPLE

Figure 2:
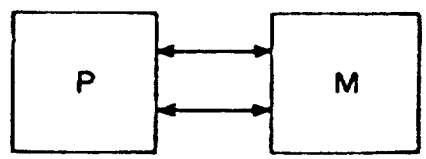
FIG. 2 is a diagram of a computer system illustrating certain background principles underlying the present invention.

Suppose the data processing part P of the computer in FIG. 2 is organized so that many independent computational activities may be carried forward concurrently — as would be true if P contains many independent sequential processors, or if P is designed to exploit the inherent parallelism of data flow programs. Activities in P will generate many independent requests to the memory system M for storage or retrieval of information. It is not essential that M respond immediately to these requests because, if P is properly organized, its resources (registers, instruction decoders, functional units) may be applied to other activities while some activities are held up by pending memory transactions. Thus the memory system need not be designed to complete one transaction before beginning the processing of other transactions. The present invention exploits this freedom by providing memory systems organized to process many transactions concurrently and to keep their constituent units heavily utilized.

PACKET COMMUNICATION MEMORY SYSTEMS

Figure 3:
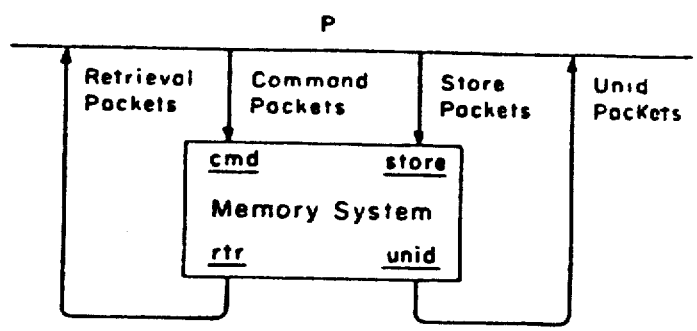
FIG. 3 is a diagram of a memory system and its parts illustrating certain background principles underlying the present invention.

As an example of packet communication architecture, consider the memory system shown in FIG. 3 which is connected to a processing system P by four channels. Command packets sent to the memory system at port $cmd$ are requests for memory transactions, and specify the kind of transaction to be performed. Each command packet contains the specification of a complete memory transaction, including the unique identifier of a structure node, an operation specification, and destination specifications for the result values. Items to be stored are presented as Store Packets at port store, and items retrieved from storage are delivered as Retrieval Packets at port $rtr$. Each Store Packet consists of the unique identifier of a structure node and a data item to be stored in the memory system. Each Retrieval Packet consists of the specification of some destination and a data value retrieved from the memory system and to be delivered to the specified destination. The role of port unid will be explained later.

For further discussion of the operation of this memory system, we must define the desired behavior — the nature of the information stored, and how the contents of Retrieval Packets depends on the contents of Store Packets previously sent to the memory system. A precise specification of behavior may take the form of an abstract memory model consisting of a domain of values and a specification of each transaction in terms of the sequences of packets passing the ports of the memory system. We give an informal outline of such a memory model.

For simplicity, the value domain V is $$V = E + [V \times V]$$

and is the union of pairs consisting of all ordered pairs of elements of V. This domain is recursively defined, and consists of all finite binary trees having elementary values at their leaves.

Our memory model must deal with the retention of information by the memory system. We use a domain of abstract memory states which are acyclic directed graphs called state graphs. Each node of a state graph represents a value (binary tree) in V in the obvious way.

The transactions of this memory model are so specified that no outgoing arc is added or deleted from a node already present in the state graph, and hence the value represented by a node never changes. A memory system having this property is attractive for applicative languages such as pure Lisp and various determinate data flow languages.

The basis of a memory state is a subset of the nodes of a state graph that includes every root node of the graph (Thus each node and arc of a state graph is accessible over a directed path from some basis node). Each basis node represents a value in terms of which the processing system may request transactions by the memory system.

Each node of a state graph has an associated reference count which is the sum of two numbers — the number of state graph arcs that terminate on the node, and the number of "references" to the node (if it is a basis node) held in the processing system P. Each node of a valid state graph must have a reference count greater than zero.

We regard the memory system as holding a collection of items that represent a state graph in the manner of a linked list structure. To this end we require a set of unique identifiers for the nodes of state graphs. One may regard each unique identifier as corresponding to a unique site in the memory system that can hold a distinct item. The items held by the memory system are of two kinds:

1. Elementary items: (elem, $i$, $e$, $r$)
   where $i$ is a unique identifier
   $e$ is an elementary value
   $r$ is a reference count
2. Pair Items: (pair, $i$, $j$, $k$, $r$)
   where $i$, $j$, $k$ are unique identifiers
   $r$ is a reference count Elementary items and pair items correspond to leaf nodes and pair nodes, respectively, of a state graph. In each item, $i$ is the unique identifier of the item.

Figure 4:
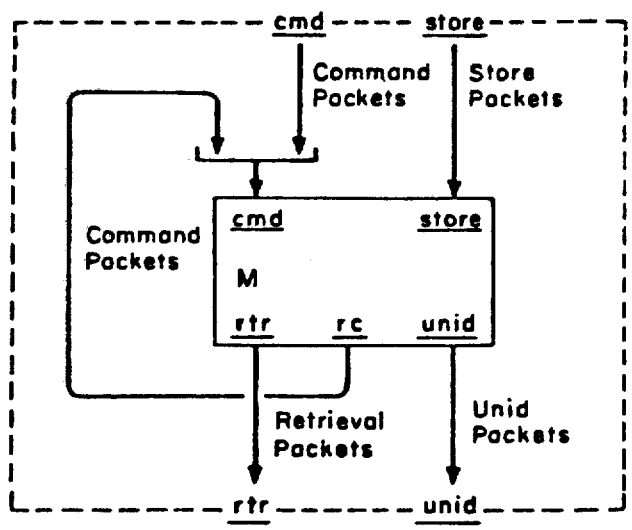
FIG. 4 is a diagram of the structure of a memory system for specification of its transactions.

For the purpose of specifying the transactions of the memory system, it is convenient to suppose that it has the structure shown in FIG. 4. Command packets delivered at port $rc$ (for reference count) of M are merged with command packets from P and presented to M at port $cmd$. We specify the behavior of the whole memory system by specifying the behavior of M. We regard the state of M as consisting of a collection of items and a collection of unique identifiers not in use. In the initial state of M the collection of items is empty and every unique identifier is not in use.

Figure 5:
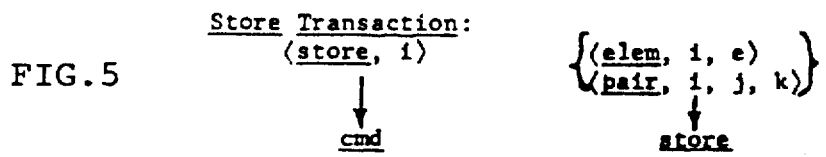
FIG. 5 illustrates symbols representing a store transaction in accordance with the present invention.

The specifications for the behaviour of M state the response, if any, and change of state, if any, that accompany each kind of transaction. In the simple memory system we are considering, there are five kinds of transactions — four of these are associated with acceptance of command packets by M, and the fifth is associated with delivery of Unid Packets. The behaviour of M for a store transaction is depicted in FIG. 5. In response to a store command packet, the item presented at port store is added to the collection of items held by M, with unique identifier $i$, and is given an initial reference count of one.

Figure 6:
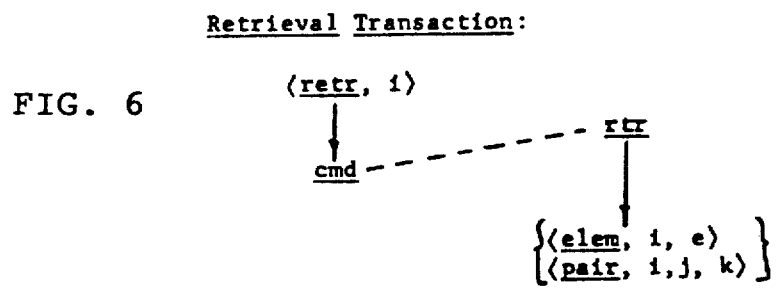
FIG. 6 illustrates symbols representing a retrieval transaction in accordance with the present invention.

A retrieval transaction is depicted in FIG. 6. The item delivered at port $rtr$ is the item with unique identifier $i$ in the collection of items held by M. The state of M does not change.

Figure 7:
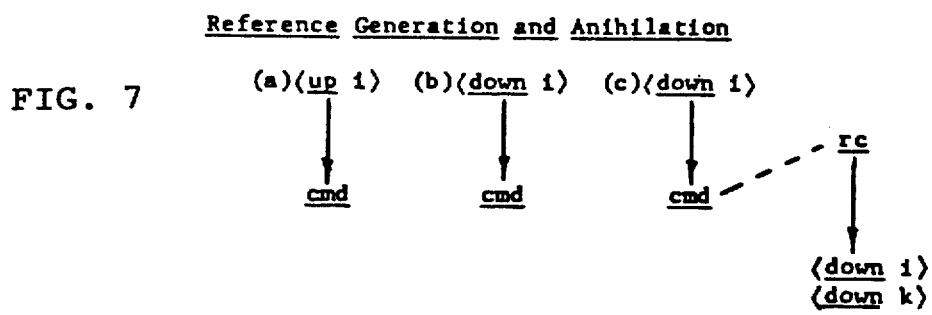
FIG. 7 illustrates symbols representing reference generation and anihilation in accordance with the present invention.

Reference generation and anihilation are depicted in FIG. 7. The up command adds one to the reference count of item $i$; the down command decrements its reference count by one. If the reference count is reduced to zero by a down command, the item is deleted from the collection of items held by M and its unique identifier $i$ is added to the collection of unused unique identifiers. Case (c) applies if the item deleted is a pair item since the reference counts of its component items must be decremented.

Figure 8:
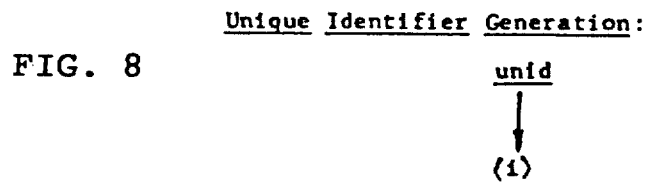
FIG. 8 illustrates symbols representing unique identifier generation in accordance with the present invention.

Unique identifier generation is depicted in FIG. 8. Some unique identifier is removed from the set of unused unique identifiers and delivered at port unid.

We have not specified the behavior of M under certain conditions that should not occur during normal operation — for example, if a store Command Packet contains a unique identifier which is already the unique identifier on an item held by M. We assume the processing system is so designed that such ill behavior cannot occur.

FURTHER DESCRIPTION AND OPERATION OF THE HIERARCHICAL MEMORY SYSTEM STRUCTURE OF FIG. 1

Structural details of memory system that supports the simultaneous processing of a large number of memory transactions and that implements the memory model and associated memory transactions detailed above is given in related application Ser. No. 715,723. The memory is structured as a plurality of sub-memory systems, each of which stores a number of data items, each data item identified by a unique identifier. Requests for memory transactions are distributed among the sub-memory systems by a distribution network which is capable of the simultaneous transfer of many memory requests to sub-memory systems. The structure of such a distribution network is detailed in realted U.S. Pat. No. 3,962,706 in FIGS. 39, 40, 41, and 42 and at column 16, line 23 to column 17, line 17. Results of memory transactions are simultaneously gathered from the sub-memory systems and formed into streams of results to be presented at the output ports of the memory system by arbitration networks. Structural details of arbitration networks capable of the simultaneous transfer of many results from the sub-memory systems are shown in related U.S. Pat. No. 3,962,706 in FIGS. 35, 36, 37, and 38 and at column 14, line 16 to column 16, line 12. Structural details of the sub-memory systems holding the data items are shown in related application Ser. No. 715,723. Each sub-memory system can be implemented as a data memory consisting of a random-access memory (RAM) for holding data items, the unique identifier of each data item being its location in the data memory, and a control memory consisting of a further random-access memory (RAM) for holding the reference count associated with each unique identifier of the data memory and for holding a list of free unique identifiers. Store and retrieval requests are implemented simply as read and write operations on the data memory. Reference count transactions are implemented through an arithmetic circuit connected to the control memory and incrementing or decrementing the reference count associated with each unique identifier in response to command packets containing up or down commands. Comparison circuitry on the output of the arithmetic circuitry continually checks the resulting reference count to see if it is zero, and if so, the unique identifier with which the reference count is associated is written into the list of free unique identifiers. The list of free unique identifiers is initially a list of all addresses in the data memory, and the free unique identifiers are presented one-at-a-time at the unid output port of the sub-memory systems.

If the memory system is to support modularity of programming in its most general form, then information must be automatically redistributed among levels of the memory system as computational activity involves different portions of the stored information.

In the embodiment of FIG. 1, a memory system M satisfying the foregoing has a hierarchical organization of two memory systems $M_H$ and $M_L$. With an important exception explained later, the lower level subsystem $M_L$ satisfies the same behavioral specification as the entire memory system M. The higher level subsystem $M_H$ is arranged to hold copies of the most active items in $M_L$ — it acts as a cache memory so M is able to achieve a much lower latency in processing transactions than $M_L$ could alone. Keep in mind that even though $M_L$ generally has long latency, it has a high rate of processing transactions due to its organization for highly parallel operation.

If there is no room in $M_H$ for an item sent to M for storage, or for an item retrieved from $M_L$, then some item is selected for deletion from $M_H$. In the illustrated embodiment, the criterion for selecting the item to be deleted is that used in contemporary cache memories. Alternatively, this criterion could be that used in contemporary paging systems. The deleted item need not be sent to $M_L$ because the memory system under discussion is organized so $M_L$ holds a copy of every item present in the memory system M. However, $M_L$ must know which items it holds have duplicates in $M_H$ so it can tell whether it is safe to release the unique identifiers of deleted items for reuse. Hence each item in $M_L$ includes an indicator $f$ that tells whether the item is also held in $M_H$:

Elementary Items: (elem, $i$, $e$, $r$, $f$)
Pair Items: (pair, $i$, $j$, $k$, $r$, $f$)
where $f$ is one of [true, false]

The transactions of $M_L$ have specifications just like those for the transactions of M, except for a few changes:

Store Transactions: The indicator $f$ of the item added to the collection is true since each Store Packet is sent to both $M_H$ and $M_L$.

Anihilation: If the reference count of an item is reduced to zero, the item is deleted and its unique identifier released for reuse only if the indicator $f$ is false.

Done Transaction: An additional form of Command Packet (done, $i$) is sent by $M_H$ to $M_L$ to say that item $i$ has been deleted from $M_H$. Subsystem $M_L$ responds by setting $f$ to false and, if the reference count is zero, the item is deleted from $M_L$ and its unique identifier is released for reuse.

In $M_H$ items are held without reference counts:
Elementary Items: (elem, $i$, $e$)
Pair Items: (pair, $i$, $j$, $k$)

Figure 9:
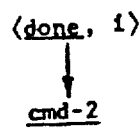
FIG. 9 illustrates symbols representing item removal in accordance with the present invention.

For the purpose of specifying the behavior of $M_H$, its state is simply a collection of items in these formats. A realization of $M_H$ requires additional state information to implement the chosen criterion for deletion of items. Item removal is a routine used by store transactions of $M_H$:

Item removal is depicted in FIG. 9. The item to be removed is deleted from the collection of items held by $M_H$ and a done Command Packet is sent at port cmd-2.

The transactions of $M_H$ follow.

Figure 10:
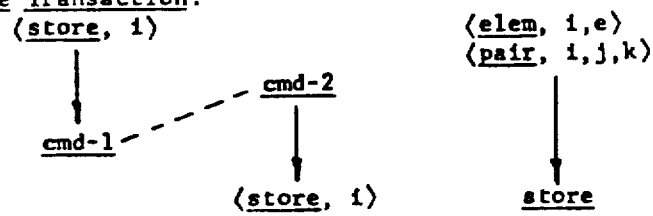
FIG. 10 illustrates symbols representing a store transaction in accordance with the present invention.

A store transaction is depicted in FIG. 10. The item is added to the collection after some chosen item is removed, if necessary, to create space. The store Command Packet is forwarded to $M_L$.

Figure 11:
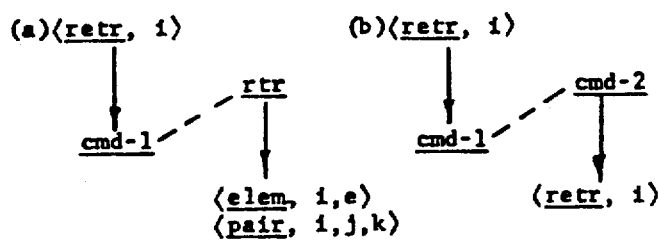
FIG. 11 illustrates symbols representing a retrieval transaction in accordance with the present invention.

A retrieval transaction is depicted in FIG. 11. Case a) applies if an item with unique identifier $i$ is in the collection held by $M_H$; otherwise case (b) applies, and the retrieval Command Packet is forwarded to $M_L$.

Figure 12:
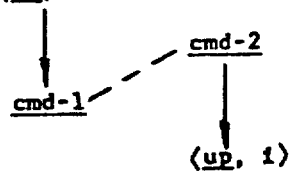
FIG. 12 illustrates symbols representing reference accounting in accordance with the present invention.
Figure 12:
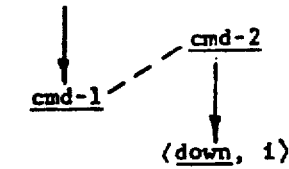

Reference accounting is depicted in FIG. 12. Up and Down Command Packets are forwarded to $M_L$ without action by $M_H$. In addition, for correct operation of the whole memory system M, all Command Packets relating to item $i$ must be delivered at port cmd-2 in the same order as they arrive at port cmd-1.

Structural details of low level memory 22 ($M_L$) are substantially the same as structural details of the packet memory shown in FIG. 4 and described above and further described in related application Ser. No. 715,723. The difference between the low level memory 22 and the packets memory system described in related application Ser. No. 715,723 arises in the connection of retrieval command port 44 to command port 26 of the high level memory 20 in the hierarchical memory system of FIG. 1, rather than command port 38 as in the one-level memory system of FIG. 4, and in the incorporation in the control memory of a copy indicator associated with each unique identifier of the data memory, designating whether the data item associated with the unique identifier is also present in high level memory 20. The arithmetic circuitry connected to the control memory increments and decrements this copy indicator in response to the execution of a store transaction or a done transaction. The comparison circuitry has an input from the copy indicator as well as the reference count, to place a unique identifier on the free cell list only when its reference count is zero and its copy indicator is false.

Structural details of high level memory 30 ($M_H$) are similar in structural details of the packet memory shown in FIG. 4 and described above and further described in related application Ser. No. 715,723. The difference between the high level memory 20 and the packet memory system described in related application Ser. No. 715,723 arises due to the fact that high level memory 20 maintains no reference counts and hence needs no control memory and attendant arithmetic and comparison circuitry and attendant reference count (rc) and unit output ports. The operation of high level memory 20 as a cache requires the addition of an associative memory to each sub-memory system, where the associative memory maps each unique identifier into a location of the data memory of the sub-memory system. A command output port (cmd-2) is then used to transfer memory requests for the retrieval of items not in high level memory 20 to low level memory 22. Thus, a command packet received by a sub-memory system of the high level memory 20 is processed by searching the associative memory of the sub-memory system for the unique identifier contained in the packet. If found, the specified memory transaction is performed. If the item designated by the unique identifier is not present in high level memory 20 and the request is a retrieval request, the command packet is transferred to low level memory 22 for processing. Also, for the deletion of items from the high level memory 20, each sub-memory system of the high level memory 20 must maintain in a status memory an ordering of the unique identifiers currently held in the sub-memory system. Receipt of a store request when the sub-memory system is full requires the selection of an item to be deleted from the sub-memory system from the ordering maintained in the status memory, transmission of a done command packet containing the unique identifier of the discarded item to the low level memory 22, and assignment of the received item to the free location. Structural details of a memory system operating as a cache in such a manner are presented in related application Ser. No. 605,932.

Since certain changes may be made in the present disclosure without departing from the scope of the present invention, it is intended that all matter described in the foregoing specification and shown in the accompanying drawings be interpreted in an illustrative and not in a limiting sense.

What is claimed is:

1. A memory system for a digital data processor, said memory system comprising:
   (a) at least a higher level sub-memory system means containing higher level records representing relatively active items of information, said higher level sub-memory system means capable of concurrent processing of a plurality of memory transactions;
   (b) at least a lower level sub-memory system means containing lower level records representing relatively inactive items of information, said lower level sub-memory means capable of concurrently processing a plurality of memory transactions;
   (c) a peripheral input network means for peripheral command signals and peripheral store signals representing peripheral command packets and peripheral store packets, respectively, by which peripheral command signals are transmitted to said higher level sub-memory system means and peripheral store signals are transmitted to said higher level sub-memory system means and to said lower level sub-memory system means;
   (d) a peripheral output network means for peripheral retrieval signals, peripheral command signals and peripheral unid (unique identifier) signals representing peripheral retrieval packets, peripheral command packets and peripheral unid packets, respectively, by which peripheral retrieval signals and peripheral command signals are transmitted from said lower level sub-memory system means and to said upper level sub-memory system means and peripheral unid signals are transmitted from said lower level sub-memory system means;
   (e) an internal output network means for internal retrieval signals and internal command signals representing internal retrieval packets and internal command packets, by which said internal retrieval signals and said internal command signals are transmitted from said higher level sub-memory system means;
(f) an internal input network means for internal command signals representing internal command packets by which said internal command signals are transmitted to said lower level sub-memory system means;
(g) said signals representing peripheral command packets and said signals representing internal command packets specifying whether a store operation or a retrieval operation is to be performed on said records representing items of information or specifying administrative transactions to be performed on said records representing items of information;
(h) said signals representing peripheral store packets and said signals representing internal store packets specifying data items to be stored in said records representing items of information;
(i) said signals representing peripheral retrieval packets and said signals representing internal retrieval packets specifying data items retrieved from said records representing items of information; and
(j) said signals representing peripheral unid packets specifying said records representing items of information and uniquely designating one of said lower level records or one of said higher level records.

2. The memory system of claim 1 wherein said lower level sub-memory system means contains a plurality of lower level memory cells, certain of said lower level memory cells being occupied by components of lower level records and others of said lower level memory cells being unoccupied by components of lower level records, said lower level memory cells being designated by components of lower level records representing unique identifiers, by components of lower level records representing reference counts, and by components of lower level records representing copy indicators.

3. The memory system of claim 1 wherein said higher level sub-memory system means contains a plurality of higher level memory cells, certain of said higher level memory cells being occupied by components of higher level records and others of said higher level memory cells being unoccupied by components of higher level records, said higher level memory cells being selected by components of higher level records representing unique identifiers.

4. The memory system of claim 1 wherein selected components of said higher level records are in correspondence with selected components of said lower level records when selected components of said lower level records representing copy indicators are set to true, and selected components of said higher level records not being in correspondence with selected components of said lower level records representing copy indicators are set to false.

5. A memory system for a digital data processor, said memory system comprising:
(a) at least a higher level sub-memory system means containing higher level records representing relatively active items of information, said higher level sub-memory system means capable of concurrent processing of a plurality of memory transactions;
(b) at least a lower level sub-memory system means containing lower level records representing relatively inactive items of information, said lower level sub-memory system means capable of concurrently processing a plurality of memory transactions;
(c) a peripheral input network means for peripheral command signals and peripheral store signals representing peripheral command packets and peripheral store packets, respectively, by which peripheral command signals are transmitted to said higher level sub-memory system means and peripheral store signals are transmitted to said higher level sub-memory system means and to said lower level sub-memory system means;
(d) a peripheral output network means for peripheral retrieval signals, peripheral command signals and peripheral unid (unique identifier) signals representing peripheral retrieval packets, peripheral command packets and peripheral unid packets, respectively, by which peripheral retrieval signals and peripheral command signals are transmitted from said lower level sub-memory system means and to said upper level sub-memory system means and peripheral unid signals are transmitted from said lower level sub-memory system means;
(e) an internal output network means for internal retrieval signals and internal command signals representing internal retrieval packets and internal command packets, by which said internal retrieval signals and said internal command signals are transmitted from said higher level sub-memory system means;
(f) an internal input network means for internal command signals representing internal command packets by which said internal command signals are transmitted to said lower level sub-memory system means;
(g) said lower level sub-memory system means containing a plurality of lower level memory cells, certain of said lower level memory cells being occupied by components of lower level records and other of said lower level memory cells being unoccupied by components of lower level records, said lower level memory cells being designated by components of lower level records representing unique identifiers, by components of lower level records representing reference counts, and by components of lower level records representing copy indicators;
(h) said higher level sub-memory system means containing a plurality of higher level memory cells, certain of said higher level memory cells being occupied by components of higher level records and others of said higher level memory cells being unoccupied by components of higher level records, said higher level memory cells being designated by by components of higher level records representing unique identifiers;
(i) said signals representing peripheral command packets and said signals representing internal command packets specifying whether a store operation or a retrieval operation is to be performed on said records representing items of information or specifying administrative transactions to be performed on said records representing items of information;
(j) said signals representing peripheral store packets and said signals representing internal store packets specifying data items to be stored in said records representing items of information;

(k) said signals representing peripheral retrieval packets and said signals representing internal retrieval packets specifying data items retrieved from said records representing items of information; and (l) said signals representing peripheral unid packets specifying said records representing items of information and uniquely designating one of said lower level records or one of said higher level records.

6. The memory system of claim 5 wherein selected components of said higher level records are in correspondence with selected components of said lower level records when selected components of said lower level records representing copy indicators are set to true, and selected components of said higher level records not being in correspondence with selected components of said lower level records when selected components of said lower level records representing copy indicators are set to false.

7. The memory system of claim 5 wherein said peripheral command signals representing peripheral command packets consist of store command signals representing store command packets, retrieval command signals representing retrieval command packets, up command signals representing up command packets and down command signals representing down command packets.

8. The memory system of claim 5 wherein receipt of command signals and store signals by said higher level sub-memory system means results in the entry of components of said higher level records.

9. The memory system of claim 5 wherein receipt of command signals and store signals by said higher level sub-memory system means results in entry of corresponding components of records in unoccupied higher level memory cells, which thereby become occupied.

10. The memory system of claim 5 wherein receipt of retrieval command signals by said higher level sub-memory system means results in transmission of retrieval signals by said higher level sub-memory system means.

11. The memory system of claim 5 wherein receipt of up command signals and down command signals by said higher level sub-memory system means results in entry of components of said higher level records representing said up command packets and said down command packets.

12. The memory system of claim 5 wherein said internal command signals include down command signals representing down command packets containing unique identifiers specifying components of higher level records deleted from higher level memory cells.

13. The memory system claim 5 wherein receipt of store signals and internal command signals by said lower level sub-memory system means results in entry of specified components of records in unoccupied lower level memory cells, said lower level memory cells thereby becoming occupied, said lower level memory cells having components of records representing copy indicators and reference counts, said components of said records representing copy indicators being set to true and said components of said records representing reference counts being set to 1 when said lower level memory cells are occupied.

14. The memory system of claim 5 wherein receipt by said lower level sub-memory system means of retrieval command signals containing a representation of unique identifiers results in transmission of signals representing information corresponding to components of information held by lower level memory cells designated by said unique identifiers.

15. The memory system of claim 5 wherein receipt by said lower level sub-memory system means of up command signals representing up command packets containing unique identifiers results in components of records of reference counts of corresponding lower level memory cells being incremented by the integer 1.

16. The memory system of claim 5 wherein receipt by said lower level sub-memory system means of down command signals representing down command packets containing unique identifiers results in components of records of reference counts of corresponding lower level memory cells being decremented by the integer 1.

17. The memory system of claim 5 wherein lower level memory cells having components of records representing reference counts that read 0 and having components of records representing copy indicators that read false are unoccupied and transmit unid signals representing peripheral unid packets.

* * * * *